United States Patent Office 2,703,803
Patented Mar. 8, 1955

2,703,803

XANTHINEALKANOATES OF DIARYLMETHOXY-ALKYLDIALKYLAMINES

Albert L. Raymond, Northfield, and John W. Cusic, Skokie, Ill., assignors to G. D. Searle & Co., Chicago, Ill., a corporation of Illinois No Drawing. Application May 31, 1952,
Serial No. 291,052

1 Claim. (Cl. 260—253)

The present invention relates to methylated xanthine-alkanoates of (diarylmethoxyalkyl)dialkylamines. These compounds can be represented by the structural formula

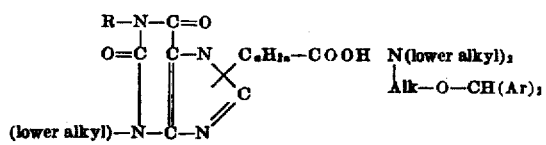

wherein $n$ is an integer smaller than 4, Alk is a lower alkylene radical containing more than one carbon atom, R is either hydrogen or a lower alkyl radical and Ar is a monocyclic aryl radical.

Among the radicals which Alk can represent are such saturated bivalent radicals as ethylene, propylene, butylene, amylene and hexylene, wherein the propylene, butylene, amylene and hexylene groups can be of the branched or unbranched type, and polymethylenes such as trimethylene and hexamethylene. Ar is a monocyclic aryl derivative such as phenyl, tolyl, xylyl, halophenyl, anisyl and phenetyl.

It is the object of this invention to provide drugs which depress the vestibular branch of the eighth cranial nerve and which lack interfering side reactions. Such specific depressants are of value in diseases associated with dysfunctions of the labyrinthine system. These are particularly useful in the control of post-operative nausea.

Example 1

30 parts of theophylline-7-acetic acid and 60 parts of β-dimethylaminoethyl benzhydryl ether are dissolved in 200 parts of hot butanone, cooled and treated with ether. The resulting oily precipitate is separated and vacuum dried to yield the 7-theophyllineacetate of β-dimethylaminoethyl benzhydryl ether melting at about 61–64° C. It has the structural formula

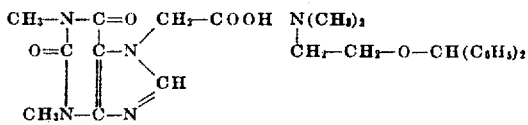

Example 2

30 parts of theophylline-8-acetic acid and 60 parts of β-dimethylaminoethyl benzhydryl ether are dissolved in 400 parts of butanone and 20 parts of water with heating. After cooling the solution is treated with ether whereupon an oily precipitate forms which is separated and dried. There is thus obtained the 8-theophyllineacetate of β-dimethylaminoethyl benzhydryl ether as a hygroscopic amorphous solid melting at about 65–70° C. It has the structural formula

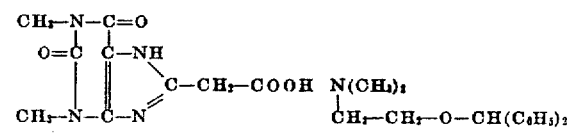

Example 3

10 parts of 3-methylxanthine-8-propionic acid and 25 parts of γ-diethylaminopropyl di-p-tolymethyl ether are dissolved in 200 parts of butanone and 10 parts of water with heating. After cooling the solution is treated with ether whereupon an oily precipitate forms which is separated and dried. The resulting salt is washed with cold anhydrous isopropanol and redried. The 3-methyl-xanthine-8-propionate of γ-diethylaminopropyl di-p-tolylmethyl ether thus obtained has the structural formula shown below. The salt shows on analysis 12.4% nitrogen.

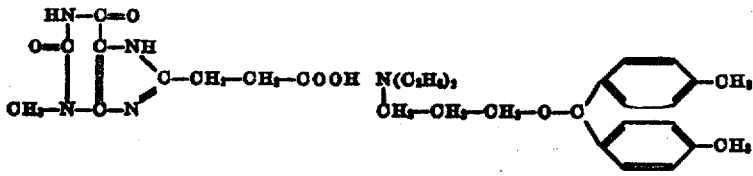

We claim:
The salt of the structural formula

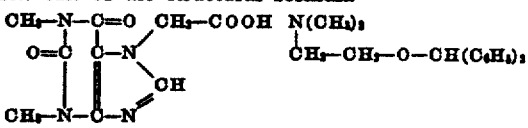

References Cited in the file of this patent
UNITED STATES PATENTS

| | | |
|---|---|---|
| 2,534,235 | Cusic | Dec. 14, 1950 |
| 2,595,853 | Horclois | May 6, 1952 |

UNITED STATES PATENT OFFICE
CERTIFICATE OF CORRECTION

Patent No. 2,703,803                          March 8, 1955

Albert L. Raymond et al.

It is hereby certified that error appears in the printed specification of the above numbered patent requiring correction and that the said Letters Patent should read as corrected below.

Column 2, line 31, for "tolymethyl" read --tolylmethyl--; columns 1 and 2, Example 3, for that portion of the formula reading "-O-C" read -- -O-CH --.

Signed and sealed this 12th day of April, 1955.

(SEAL)
Attest:
E. J. MURRY
Attesting Officer

ROBERT C. WATSON
Commissioner of Patents